Nov. 13, 1956 C. J. MALONE 2,770,682

TELEPHONE HANDSET HOLDER

Filed Sept. 30, 1953 2 Sheets-Sheet 1

INVENTOR.
CHARLES J. MALONE

BY [signature]

ATTORNEY

CHARLES J. MALONE
INVENTOR.

BY [signature]

ATTORNEY

United States Patent Office 2,770,682

Patented Nov. 13, 1956

2,770,682

TELEPHONE HANDSET HOLDER

Charles J. Malone, New York, N. Y.

Application September 30, 1953, Serial No. 383,182

4 Claims. (Cl. 179—150)

This invention relates to telephone handset holders.

The main object of the invention resides in the provision of a telephone handset holder which permits the user to carry on a telephone conversation without employing either hand thereby permitting the user to hold a paper with one hand and a writing instrument with the other for the purpose of recording any telephone messages and, in general, permitting the user to employ his hands for a multitude of purposes while carrying on a telephone conversation.

A further object of the invention resides in the provision of a telephone handset holder of the above type which includes novel means for retaining the holder in operative position and which prevents the telephone switches from being opened during the conversation.

Other objects of the present invention are to provide a telephone handset holder which is readily adaptable to conventional telephone handsets, is of simple construction, is inexpensive to manufacture, has a minimum number of parts, is easy to use and efficient in operation.

For other objects and a better understanding of the invention, reference may be had to the following detailed description taken in connection with the accompanying drawing, in which.

Figures 1, 3:
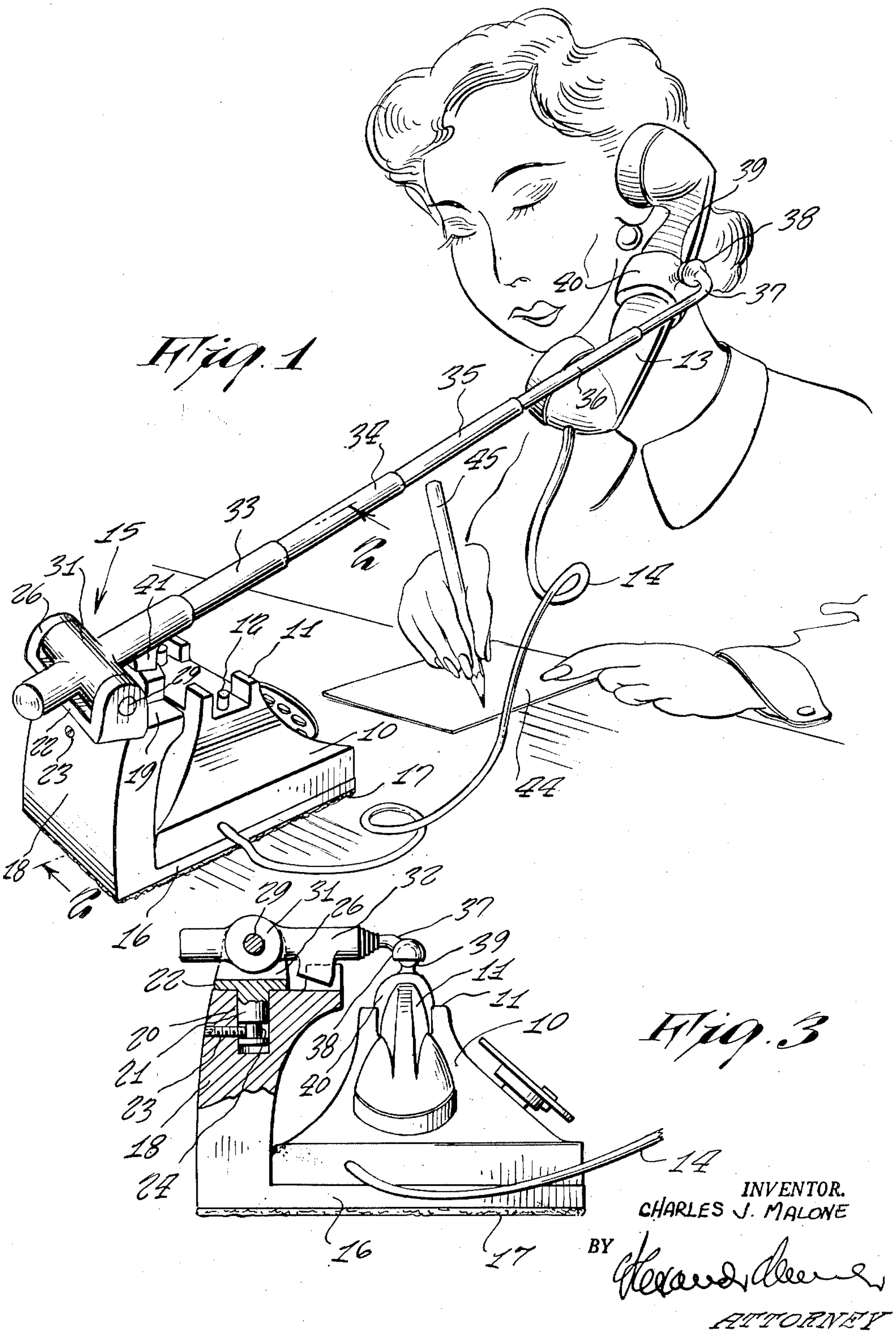
Figure 1 is a perspective view of a telephone handset holder embodying the features of the present invention and shown in operative use.
Fig. 3 is a view similar to Fig. 2 but showing the holder in the inoperative position with the handset resting in the telephone cradle.

Referring now more in detail in the drawings, wherein similar reference numerals identify corresponding parts throughout the several views, there is shown a conventional telephone handset including a base or pedestal 10, a cradle 11, push button switches 12 and a handset 13, the handset 13 being adapted to rest normally in cradle 11 whereby to open the switches 12 and being connected to the pedestal 10 by insulated cord 14.

Considering the need for means to hold the handset 13 adjacent to the user's ear so as to permit both hands to be left entirely free for taking telephone messages and for turning the pages of catalogues and books, I have devised a telephone handset holder, referred to collectively as 15, and including a flat tabular base 16 adapted to support the pedestal 10 thereon, the undersurface of the tabular portion 16 being provided with the felt covering 17 to avoid scratching the desk or other supporting surface.

Figures 2, 4, 5, 6:
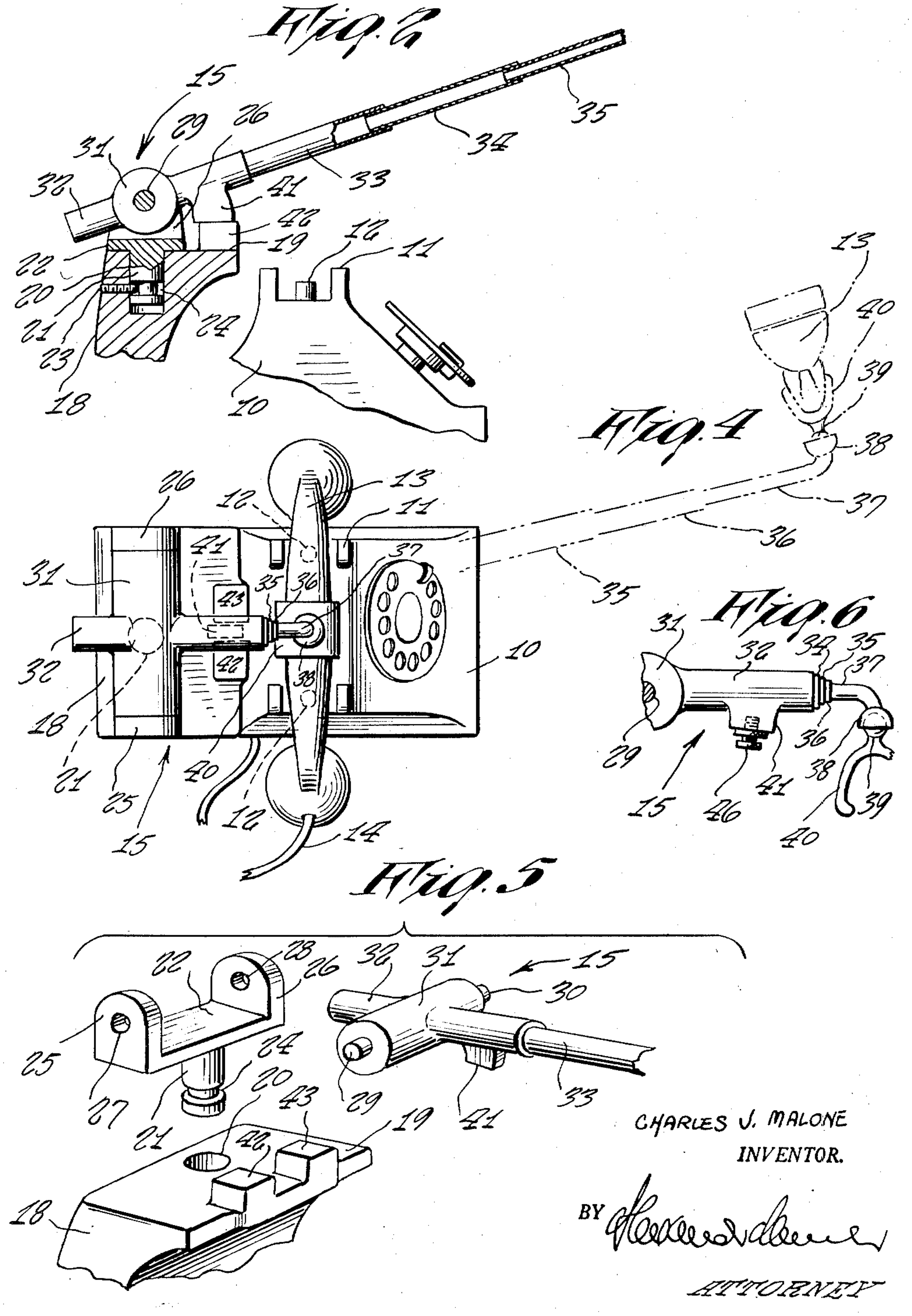
Fig. 2 is a fragmentary side view, shown partly in elevation and partly in section, taken along the line 2—2 of Fig. 1 and showing the holder in the operative position.
Fig. 4 is a top plan view of the holder in the inoperative position.
Fig. 5 is a fragmentary exploded perspective view of the horizontal and vertical rotating joints forming a part of the invention and Fig. 6 is a fragmentary side elevational view of a modified form of the present invention shown alone.

The base 16 is provided along its rear edge with an upright 18, the upper end of the upright 18 terminating in an enlarged tabular portion 19. It will be noted that the forward edge of the tabular portion 19 overhangs the handset base 10, permitting the latter to fit completely on the base 16 (Fig. 3). The tabular supporting surface 19 near its rear edge is provided with a downwardly extending cylindrical bore 20 which slidably receives a cylindrical shank 21 integrally formed on the undersurface of a turntable 22 (Fig. 5). A stud 23 is screwthreaded into the rear face of the upright 18 (Fig. 3), communicating with the bore 20 and being received within an annular slot 24 provided near the lower end of shank 21 and limiting the upward displacement of the latter while at the same time permitting rotation of the shank 21 within bore 20.

The turntable 22 slidably rests on the upper surface of the tabular portion 19 and is integrally formed at each end with uprights 25 and 26 having aligned openings 27 and 28, respectively, the openings 27 and 28 serving as bearings for the butt ends 29 and 30 of a cylindrical member 31 (Fig. 5) whereby to rotatably mount the latter about its longitudinal axis.

The cylindrical member 31 is integrally formed at right angles thereto with a second cylindrical member 32, the forward end of the second cylindrical member 32 having a cylindrical bore and mounting therewithin the endmost element 33 of a telescopic arm including additional elements 34, 35 and 36.

An L-shaped member 37 is suitably secured within the outermost element 36 and terminates in a universal joint including a socket 38 and a ball 39, a resilient U-shaped clamp 40 adapted to surround the handle portion of the handset 13 being fixedly carried by the ball 39. It will be noted that the telescopic arm when retracted, will permit the handset 13 (which is secured within the clamp 40) to rest in its usual position on the push-button switches 12 in cradle 11 (Fig. 3).

As a means of retaining the telescopic arm in a raised position when the handset 13 is being used and also as a means of retaining the switches 12 in a closed position during the telephone conversation, the undersurface of the forward portion of cylindrical member 32 is integrally formed with an arcuate, downwardly extending lug 41 which is normally received between a pair of spaced upwardly extending lugs 42 and 43 when the telescopic arm is retracted and the handset 13 is not in use (Fig. 3). It will be noted that the lower edge of the lug 41 in the aforesaid position is inclined to and freely spaced from the upper surface of tabular portion 19. It will also be noted that the lugs 42 and 43 are laterally spaced from each other and present relatively wide upper surfaces whereby to support the lower edge of the lug 41 upon upward movement of the telescopic arm and the shifting of the same about the axis of shank 21 (Fig. 1). Thus, the lug 41 and more particularly the lower edge thereof will be disposed in a substantially horizontal direction when the telescopic arm is raised to the position of Fig. 1, permitting this lower edge to rest and be retained on either of the lugs 42 or 43.

In operation, and starting with the device in the retracted position of Fig. 3, when the telephone rings, the handset 13 will be lifted in the usual manner whereupon the telescopic arm will be extended to the position of Fig. 1. This lifting of the handset 13 and the extending of the telescopic arm will raise the lug 41 from between the lugs 42 and 43 and permit the telescopic arm to be rotated about the axis of shank 21, permitting the lug 41 to rest on either of the lugs 42 and 43. Meanwhile, the handset 13 is adjusted to the most comfortable position about the universal joint at the end of the telescopic arm. With the handset thus comfortably positioned adjacent the user's ear, as shown in Fig. 1, it will be apparent that both hands are then free for the purpose of holding a writing pad or paper 44 and a pencil or writing instrument 45, permitting the user to take down telephone messages while at the same time carrying on the conversation. The user's hands may also be utilized to turn the pages of catalogues and to look up information required for the telephone conversation. After completion of the call, the telescopic arm is retracted and the lug 41 rotated to its inoperative position between the lugs 42 and 43 permitting the handset 13 to rest in its normal position on switches 12 and to open the latter.

Referring now particularly to Fig. 6, there is shown a modified form of the present invention wherein the elevation of the telescopic arm, when in use, may be adjusted by means of a set screw 46 screw-threaded into the bottom of lug 41, the head of set screw 46 then normally resting on the upper surfaces of the lugs 42 or 43. It will be apparent that by adjusting the distance of the head of screw 46 from the lower edge of the lug 41, the angle of elevation of the telescopic arm when extended can also be adjusted to the sitting height of the user.

While various changes may be made in the detail construction, it shall be understood that such changes shall be within the spirit and scope of the present invention, as defined by the appended claims.

What is claimed is:

1. A telephone handset holder comprising a flat tabular portion adapted to support the telephone base thereon, an upright at one end of said base, a telescopic arm, means for rotating said telescopic arm at one end thereof about a substantially vertical axis at the top of said upright, means for rotatably mounting said telescopic arm at said end about a substantially horizontal axis on the top of said upright, means for securing the telephone handset to the other end of said telescopic arm, and means for supporting said telescopic arm in a raised operative position upon angular displacement of said telescopic arm about a vertical axis, said last mentioned means being adapted to permit said telescopic arm to be lowered to a substantially horizontal, inoperative position upon reversal of said angular rotation, said means for rotatably mounting said telescopic arm at one end thereof about a substantially vertical axis on the top of said upright comprising the upper end of said upright having a flat substantially horizontal upper surface, said upper surface having a downwardly extending, substantially vertical, substantially cylindrical opening, a turntable adapted to rotate on the upper surface of said upright, a substantially cylindrical, downwardly extending shank carried on the undersurface of said turntable and extending downwardly at substantially right angles thereto, said shank being rotatably received within said opening and means for preventing upward displacement of said shank in said opening while at the same time permitting rotation therein, said telescopic arm at one end being mounted on said turntable.

2. A telephone handset holder according to claim 1, said means for preventing upward displacement of said shank within said opening comprising a set screw screw-threaded into said upright at substantially right angles to and communicating with said opening near the bottom thereof, said shank at the lower end thereof having an annular groove adapted to receive the inner end of said set screw.

3. A telephone handset holder according to claim 1, means for rotatably mounting said telescopic arm at one end thereof about a substantially horizontal axis comprising said turntable at each end thereof having uprights, said uprights having aligned openings, and a transverse member secured to one end of said telescopic arm at substantially right angles thereto, said transverse member at each end being provided with substantially cylindrical ends rotatably mounted within said aligned openings.

4. A telephone handset holder comprising a flat tabular portion adapted to support the telephone base thereon, an upright at one end of said base, a telescopic arm, means for rotating said telescopic arm at one end thereof about a substantially vertical axis at the top of said upright, means for rotatably mounting said telescopic arm at said end about a substantially horizontal axis on the top of said upright, means for securing the telephone handset to the other end of said telescopic arm, and means for supporting said telescopic arm in a raised operative position upon angular displacement of said telescopic arm about a vertical axis, said last mentioned means being adapted to permit said telescopic arm to be lowered to a substantially horizontal, inoperative position upon reversal of said angular rotation, said last mentioned means comprising a pair of spaced lugs provided on the upper surface of said upright, a downwardly extending lug provided on the undersurface of said telescopic arm adapted to fit between said upwardly extending lugs, said lug when intermediate said spaced lugs having a lower edge inclined to and freely spaced from the top surface of said upright, said lower edge being adapted to rest on the upper surface of either of said lugs in a substantially horizontal position when said telescopic arm is raised and rotated about a vertical axis.

References Cited in the file of this patent

UNITED STATES PATENTS

| | | |
|---|---|---|
| 2,435,816 | Anderson | Feb. 10, 1948 |
| 2,602,863 | Raymond et al. | July 8, 1952 |
| 2,663,764 | Holmes | Dec. 22, 1952 |